Figure 1:
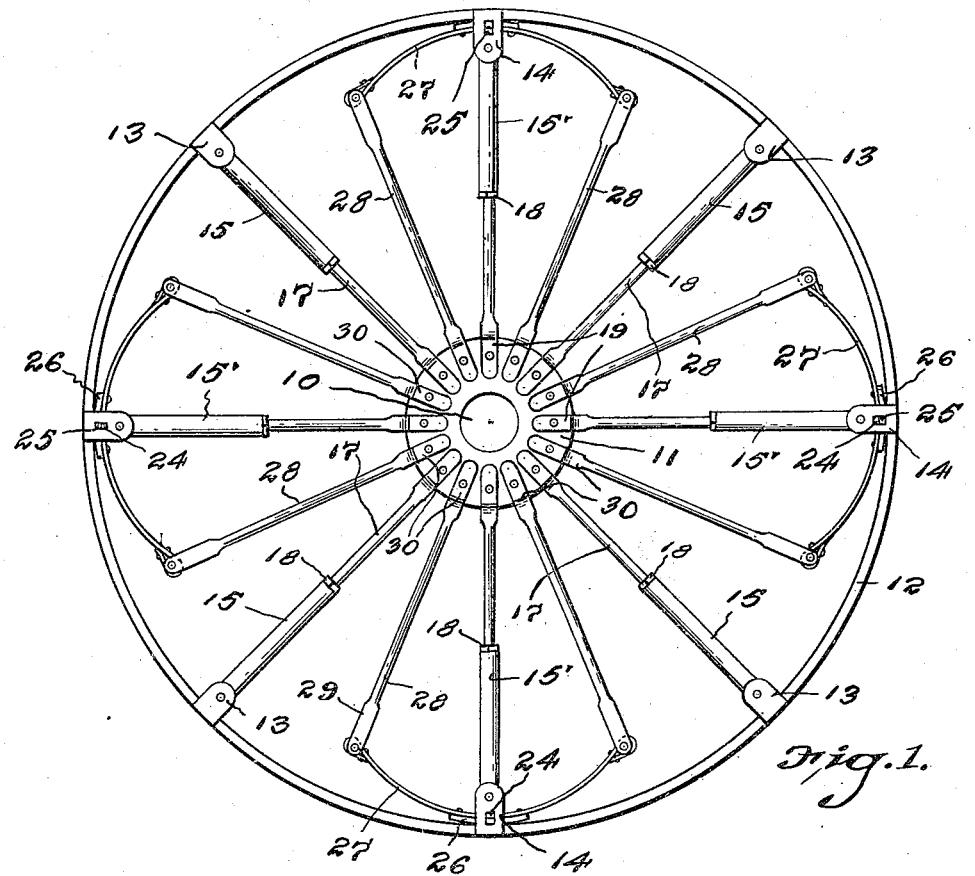

R. E. SAVERY.
RESILIENT WHEEL.
APPLICATION FILED SEPT. 17, 1918.

1,295,214.

Patented Feb. 25, 1919.

Inventor
R. E. Savery,
By H. Woodward.
Attorney

UNITED STATES PATENT OFFICE.

ROBERT E. SAVERY, OF KNOX, INDIANA.

RESILIENT WHEEL.

1,295,214. Specification of Letters Patent. Patented Feb. 25, 1919.

Application filed September 17, 1918. Serial No. 254,404.

*To all whom it may concern:*

Be it known that I, ROBERT E. SAVERY, a citizen of the United States, residing at Knox, in the county of Starke and State of Indiana, have invented certain new and useful Improvements in Resilient Wheels, of which the following is a specification.

The invention has for an object to effect improvements in spring wheel constructions, whereby a minimum number of springs will be required, and the connections between the hub and a relatively movable rim and interposed springs will be simplified and cheapened.

Figure 2:
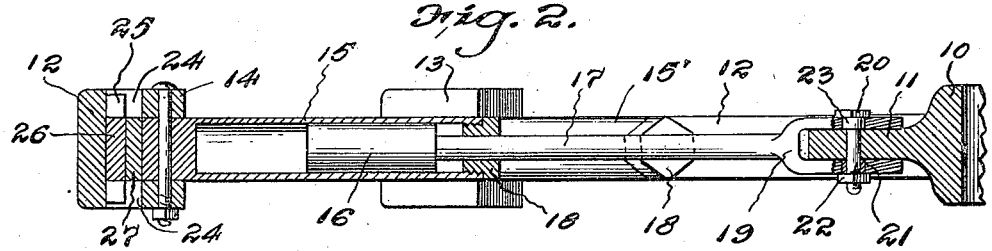
Figure 3:
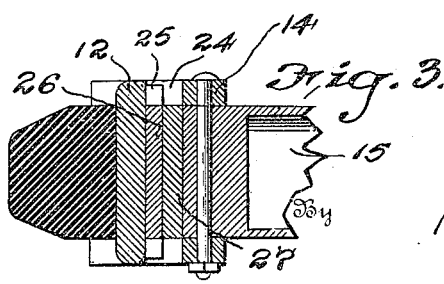

It is an especial aim of the invention to provide a wheel with ample lateral rigidity without involving heavy or expensive construction, while at the same time giving a maximum freedom of movement radially. A specific object of the invention is to improve the method of mounting the springs upon a rim of this character, whereby necessity for forming rivet holes or apertures for fastenings in the outer rim will be obviated. Additional objects, advantages and features of invention may appear from the construction, arrangement and combination of parts hereinafter described and shown in the drawings, wherein;

Figure 1 is a side elevation of a wheel constructed in accordance with my invention, partly in section, Fig. 2 is a diametrical sectional view of one half of the wheel, Fig. 3 is a detail sectional view of a rim constructed for use with a cushion tire.

There is illustrated a wheel comprising a hub element 10, including a body portion having a suitable construction of any desirable kind for enabling its mounting upon spindle or axle, and including a large thick circumscribing flange 11, located in the medial plane of the wheel, and formed with a multiplicity of openings therethrough suitably spaced to permit the pivoting of spokes therein, as will be described.

The wheel also includes an outer rim element 12, which may be, if desired, formed for the mounting of a cushion tire, as indicated in Fig. 3, or, as shown in Figs. 1 and 2, may be used directly upon the roadway. The rim is preferably in the shape of a continuous circular body having integral ears 13 and 14 formed alternately thereon at suitably spaced intervals, the ears 13 having cylinder elements 15 pivoted therebetween, the open ends of the cylinders being directed inwardly toward the hub. Reciprocable in the cylinders there are pistons 16, the stems 17 of which are extended through the open end of the cylinders, dust caps 18 being provided on the open ends of the cylinders around the stems 17. The outer ends of the stems next the hub are forked as at 19, the furcations being parallel and of a length to embrace snugly the flange 11 for a distance, bolts 20 being engaged through the forks and flange to hold the forks pivotally upon the flange. The opposite sides of the flange are parallel and smoothly finished in order to permit a snug fit thereof in the forks. The bolts 20 are headed at one end and formed with a long tenon which is engaged through the flange, a sleeve 21 being engaged around the tenon at the side of the flange 11 opposite the head of the bolt, and a nut 22 screwed upon the bolt, against the sleeve 21, thus drawing the enlarged portion 23 of the bolt snugly against the flange at one side and the bearing sleeve 21 against the opposite side, the portions 21 and 23 being engaged by the respective furcations of the forks 19.

The ears 14 upon the rim 12 are somewhat longer than those numbered 13, and are formed with slots 24 adjacent their bases. Projected through the slots there are integral trunnions 25, of spring saddles 26, upon which there are secured respective semi-elliptical springs 27, upon the outer ends of which there are pivoted respective one piece spoke 28, suitably furcated at 29 for the purpose, their inner ends being furcated at 30 in the same manner as the inner ends of the pistons 17, and likewise pivoted upon the flange 11 of the hub.

Between the ends of the ears 14, there are pivoted cylinders 15', similar to those 15 before mentioned and having like pistons and stems mounted therein and connected to the hub, in the same way. The cylinders 15 and stems 17, as well as the cylinders 15' and their respective piston stems, may be termed telescopic spokes, and by reason of the snug fit of the stem forks upon the hub flange, as well as the snug fit of the pistons in the cylinders and the stems 17 in the cap 18, the hub is securely held against lateral movement with respect to the rim 12.

It will be seen that by this construction it is possible to support two spokes upon each spring, with the spokes spaced properly apart, thus enabling the use of springs of considerable strength, yet providing ample resiliency and play.

In the production of the rim, the blank therefor being stamped out suitably, before the ears are bent inwardly, the springs 27 are assembled upon their respective saddles, and the saddles laid upon the inner side of the rim with their trunnions alined with the slots 24, after which the ears are bent inwardly, thus bringing the slotted portion around the trunnions and securing the saddles and their springs in place.

In the present instance, four springs are shown, and it is thought that this number will be ample with the construction shown, these springs making it possible to mount eight equally spaced spokes thereon.

In the use of the wheel, when one of the telescopic spokes intermediately of one spring is disposed vertically downward, the major part of the load will come upon the ends of that spring, as will be understood, and as the rigid spoke at either end of a spring approaches vertical position, more of the load is taken up by the next adjacent of the spring at that side, and when one of the telescopic spokes intermediately of the spring is disposed vertically, equal parts of the load are borne by adjacent springs. With proper design, the flexure of the springs in the last mentioned position is such that no greater support will be given thereby than would be given by one spring when the wheel is in the first mentioned position, so that no bumping effect is produced or unequal support to the load given.

In the event that one of the springs 27 becomes broken, it is only necessary to remove the nut and bolt; the bolt of which is extended through the ears 14, such operation disconnecting the cylinder 15' from the ears 14. The spokes connected to the ends of the broken spring may next be disconnected, permitting the removal of the broken parts; a new spring substituted therefor, and the parts bolted together properly.

What is claimed:

1. A device of the character described comprising a hub portion having a medial planiform flange, a rim element alined therewith, a series of telescopic spokes connected between the rim and flange, so connected to the flange as to resist lateral oscillation, rigid spokes intermediately of the telescopic spokes, semi-elliptical springs carried upon the rim with their end portions bearing inwardly and connected to respective rigid spokes, said springs having their central portions secured to the rim.

2. In a wheel of the character described, a rim element having a multiplicity of inturned ears thereon, arranged in pairs transversely of the rim, certain of the ears having longitudinally extended slots therein at their bases, saddle seat elements adapted to fit snugly between the ears and having trunnions for engagement through said slots, whereby, in the formation of the rim, the saddles may be laid against the surface thereof and the ears bent into position to engage around said trunnions, spring elements carried by the saddle, telescopic spokes connected between the ears, and rigid spokes connected to the ends of the springs, and a hub element connected to the said spokes.

In testimony whereof I have affixed my signature in presence of two witnesses.

ROBERT E. SAVERY.

Witnesses:
JAMES C. FLETCHER,
CHARLES W. WENINGER.

Copies of this patent may be obtained for five cents each, by addressing the "Commissioner of Patents, Washington, D. C."